(12) United States Patent
Yancey et al.

(10) Patent No.: US 9,720,951 B2
(45) Date of Patent: Aug. 1, 2017

(54) REDUCING DATABASE DOWNTIME

(71) Applicant: salesforce.com, inc., San Francisco, CA (US)

(72) Inventors: Scott Yancey, San Francisco, CA (US); Chandni Jain, San Francisco, CA (US); Gerald Noorthoek, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/936,535

(22) Filed: Nov. 9, 2015

(65) Prior Publication Data
US 2016/0063048 A1    Mar. 3, 2016

Related U.S. Application Data

(63) Continuation of application No. 13/043,276, filed on Mar. 8, 2011, now Pat. No. 9,183,088.
(Continued)

(51) Int. Cl.
*G06F 17/30* (2006.01)
*G06F 11/14* (2006.01)

(52) U.S. Cl.
CPC ........ *G06F 17/30368* (2013.01); *G06F 11/14* (2013.01); *G06F 17/30292* (2013.01);
(Continued)

(58) Field of Classification Search
CPC ............. G06F 11/1435; G06F 11/1443; G06F 11/1456; G06F 11/1464; G06F 11/1469; G06F 11/2038; G06F 11/2048; G06F 11/2056; G06F 17/30578; G06F 2209/5018; G06F 2209/5022; G06F 9/4856; G06F 9/5033; G06F 9/5072; G06F 9/5088; G06F 17/30; G06F 17/00
See application file for complete search history.

(56) References Cited

U.S. PATENT DOCUMENTS 5,577,188 A    11/1996    Zhu
5,608,872 A    3/1997    Schwartz et al.
(Continued)

OTHER PUBLICATIONS

Non-Final Office Action for U.S. Appl. No. 13/043,276, mailed Jun. 8, 2012, 22 pages.
(Continued)

*Primary Examiner* — Yicun Wu
(74) *Attorney, Agent, or Firm* — Alpine Technology Law Group LLC (57) ABSTRACT

Embodiments enable reduction of database downtime in a live production environment of an on-demand database service during repair and/or maintenance tasks. A source database and a target database are provided. Data is copied from the source database to the target database to create a mirrored set of data. Access is limited to one or more designated tables in the target database. General traffic is redirected from the source database to the target database, wherein the redirection occurs for a duration of a maintenance period. Data modifications that occur in the target database during the maintenance period are captured and then replicated into the source database. Finally, general traffic is redirected from the target database to the source database.

30 Claims, 5 Drawing Sheets

Related U.S. Application Data (60) Provisional application No. 61/319,755, filed on Mar. 31, 2010.

(52) U.S. Cl.
CPC .. *G06F 17/30362* (2013.01); *G06F 17/30377* (2013.01); *G06F 17/30557* (2013.01); *G06F 17/30581* (2013.01); *G06F 17/30864* (2013.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0078591 A1 | 4/2004 | Teixeira et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0136479 A1* | 6/2006 | Fan | G06F 21/6227 |
| 2007/0067357 A1 | 3/2007 | Clark | |
| 2008/0065640 A1 | 3/2008 | Shulman et al. | |
| 2008/0148342 A1* | 6/2008 | Aiyagari | H04L 12/462 726/1 |
| 2009/0019094 A1 | 1/2009 | Lashley et al. | |
| 2011/0131190 A1 | 6/2011 | Pooley et al. | |

OTHER PUBLICATIONS

Non-Final Office Action for U.S. Appl. No. 13/043,276 mailed Jul. 24, 2014, 30 pages.
Final Office Action for U.S. Appl. No. 13/043,276 mailed Jan. 16, 2013, 26 pages.
Notice of Allowance for U.S. Appl. No. 13/043,276 mailed Jul. 8, 2015, 7 pages.

\* cited by examiner

REDUCING DATABASE DOWNTIME

CROSS-REFERENCE TO RELATED APPLICATIONS

The present continuation application claims the benefit of U.S. patent application Ser. No. 13/043,276, entitled "Reducing Database Downtime", by Scott Yancey, et al., filed Mar. 8, 2011, and also claims the benefit of U.S. Provisional Patent Application No. 61/319,755, entitled "Systems and Methods for Reducing Down Time During an Upgrade", by Chandi Jain, et al., filed Mar. 31, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention generally relates to system upgrades, and more particularly to reducing down-time during an upgrade of an on-demand database and/or application service.

Databases have become a fixture in the infrastructure underlying online applications as diverse as customer support call centers, online banking, electronic storefronts, social networks, search engines, news and media websites, etc. Such online applications are typically expected to be "always on" and continually available, whether externally accessible by the general public or restricted for internal use only (e.g., administrative applications). However, such expectations may be frustrated due to website downtime resulting from database-related tasks such as required regular maintenance procedures, updates, troubleshooting, and fixes. Such downtime is not only frustrating for end users, but can be costly for the providers of those on line applications if they end up losing the opportunity to generate transactions or increase viewership and participation. In addition, the need to get a website back up quickly may contribute to errors and omissions while performing the necessary tasks, due to haste and stress.

Therefore it is desirable to provide systems and methods that overcome the above and other problems.

The subject matter discussed in the background section may not be assumed to be prior art merely as a result of its mention in the background section. Similarly, a problem mentioned in the background section or associated with the subject matter of the background section may not be assumed to have been previously recognized in the prior art. The subject matter in the background section merely represents different approaches, which in and of themselves may also be inventions.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

SUMMARY

Embodiments described herein provides systems, apparatus, and methods for reducing database downtime. Embodiments enable minimization of website downtime during tasks such as maintenance procedures, updates, troubleshooting, and fixes.

Embodiments enable reduction of database downtime is a live production environment of an on-demand database service during repair and/or maintenance tasks. A source database and a target database are provided. Data is copied from the source database to the target database to create a mirrored set of data. Access is limited to one or more designated tables in the target database. General traffic is redirected from the source database to the target database, wherein the redirection occurs for a duration of a maintenance period. Data modifications that occur in the target database daring the maintenance period are captured and then replicated into the source database. Finally, general traffic is redirected from the target database to the source database.

In some embodiments, general traffic comprises requests received via one of a web server, an application server, a function call to an application programming interface, and a local application.

In some embodiments, limiting access to a table comprises permitting only read access. In some embodiments, limiting access to the one or more designated tables in the target database comprises: configuring properties for a limited user of the target database indicating that access to the one or more designated tables is to be limited; configuring database-level triggers in the target database to check user properties to determine access permissions; and configuring properties related to the general traffic to access the target database through the limited user.

Some embodiments comprise receiving a request via general traffic related to a table designated for limited access and transmitting information to display an indication that access to information is limited. The indication that access to information is limited may comprise modifying or removing a button or link to permit edits to information.

In some embodiments, copying data from the source database to the target database comprises continually updating the target database in real-time until a cutover process is initiated. In some embodiments, copying data from the source database to the target database comprises a single batch process performed immediately prior to redirecting general traffic from the source database to the target database.

In some embodiments, redirecting general traffic comprises configuring one or more load balancers. Some embodiments comprise concurrently permitting the administrative traffic to access the source database while redirecting the general traffic from the source database to the target database. Some embodiments comprise determining whether a request is related to general traffic or administrative traffic based on the IP address of the request.

Other embodiments of the invention are directed to systems and non-transitory computer-readable media associated with methods described herein.

While the present invention is described with reference to an embodiment in which techniques for reducing database downtime in an on-demand services environment are implemented in a system including a single source database and a single target database, the present invention is not limited to such embodiments. In addition, embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

I. General Overview

Systems, apparatus, and methods are described for reducing database downtime. Such embodiments can increase availability of online applications that rely upon a database. Website downtime is a significant impediment to the online operations of a business or other organization that needs to meet the "always-on" expectations of its users. Embodiments enable efficient database maintenance and increase website uptime.

The present invention provides systems and methods for implementing system upgrades, and more particularly to systems and methods for reducing down-time during an upgrade of an on-demand database system and/or application service.

II. System Overview

Figure 1:
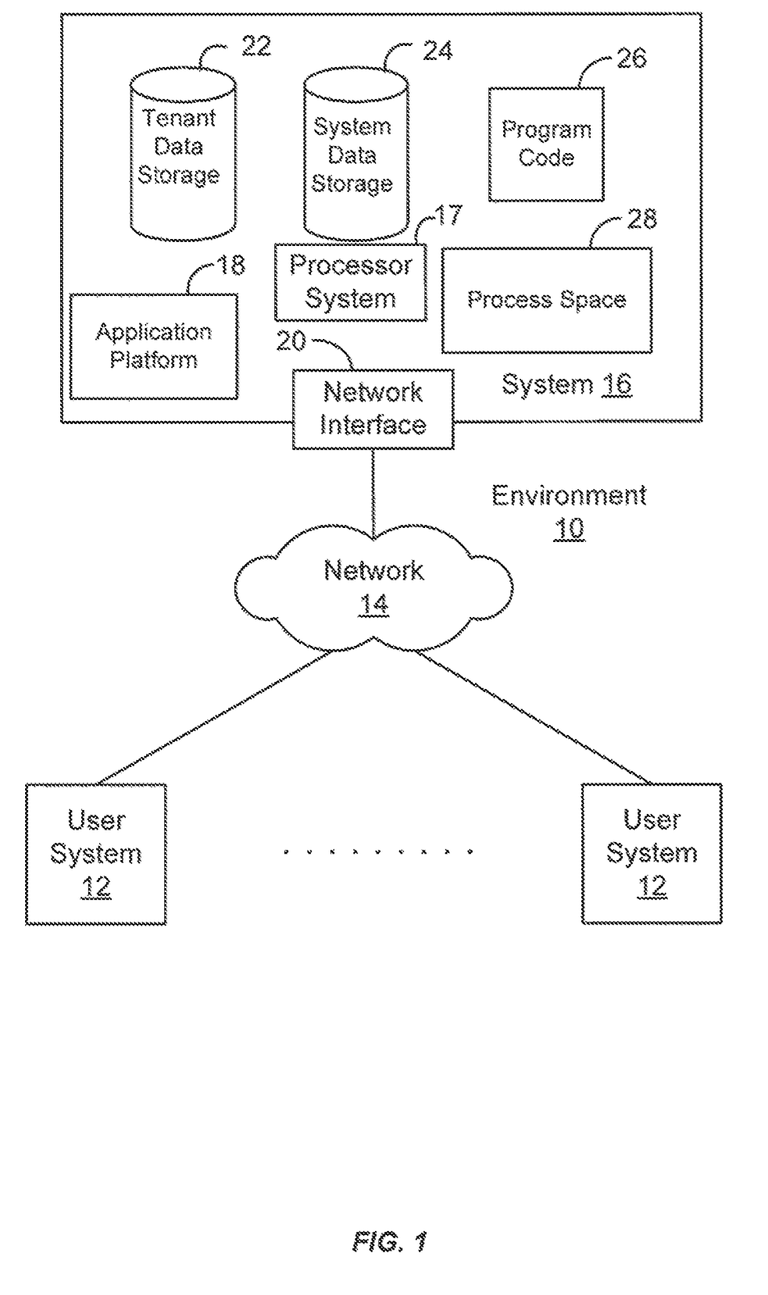
FIG. 1 illustrates a block diagram of an example of an environment wherein some embodiments described herein might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such a the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA, or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® Processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatiles memory medium or device as is well known, such as a ROM or RAM, or provided on any media capable of storing program code, such as any type of rotating media including floppy disks, optical disks, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, Java Script, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations, Additionally the term "server" is meant to include a computer system, including processing hardware and process spaces(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
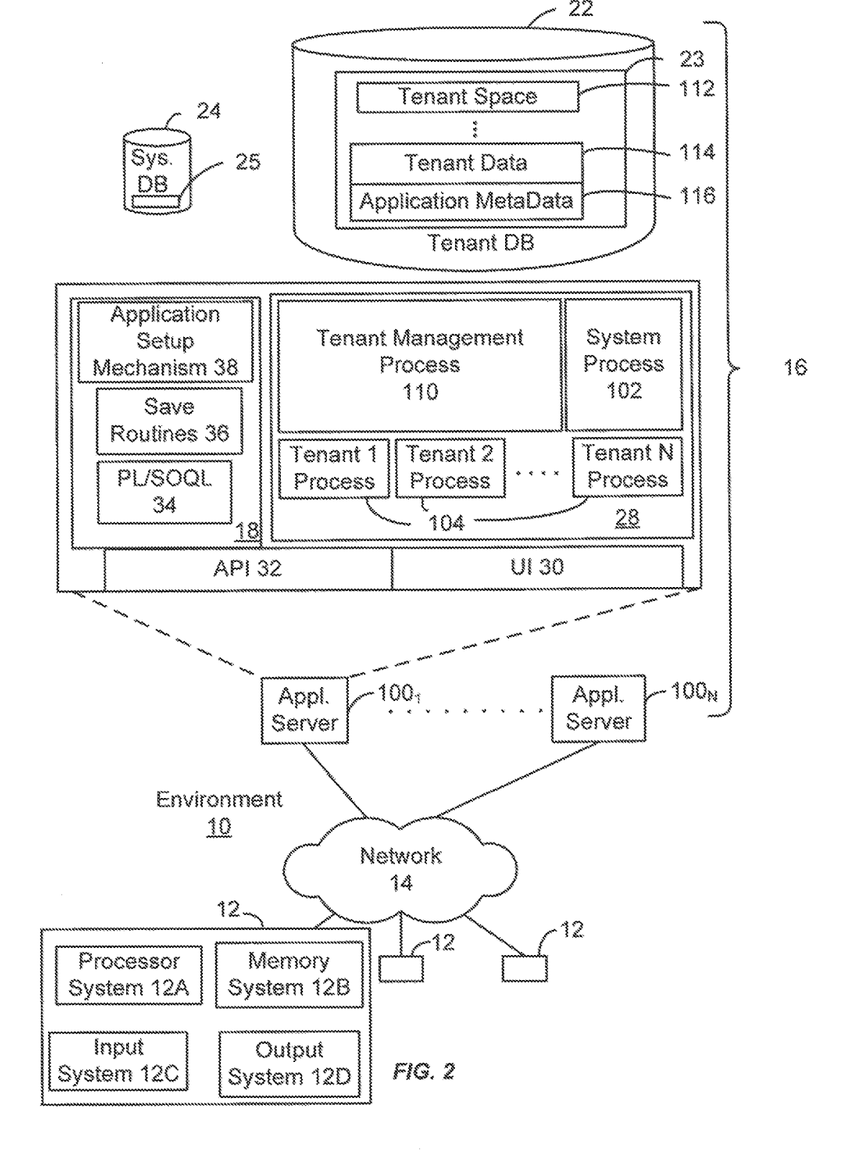
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34 save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Reducing Down-time During a System Upgrade

Systems and methods are provided for eliminating virtually all planned downtime from affecting customers of a multi-tenant database system, such as that provided by salesforce.com, Inc. An example website, e.g., salesforce.com, may have four releases every year with about five hours of downtime each. In addition, other scheduled maintenance tasks may result in down-time (e.g., database kernel patches, storage volume changes, etc.). Down-time is not usually acceptable to customers, particularly those who operate 24/7/365 (e.g., call centers).

In some embodiments, downtime is minimized by cutting over from a live database (the "source" database) to a mirrored database (the "target" database while performing maintenance and repair tasks upon the live database, wherein updates to the mirrored database are restricted for most functions, and any updates that do occur are tracked or logged. In this manner, several important benefits are realized: access to data is maintained even while database maintenance and/or repairs are proceeding; the time required to re-sync any updates to the mirrored database back to the live database is minimized because updates to the mirrored database are restricted; and downtime is limited to the time required for the actual process of cutting over from one database to another without including the time required for the maintenance and/or repair tasks.

Figure 3:
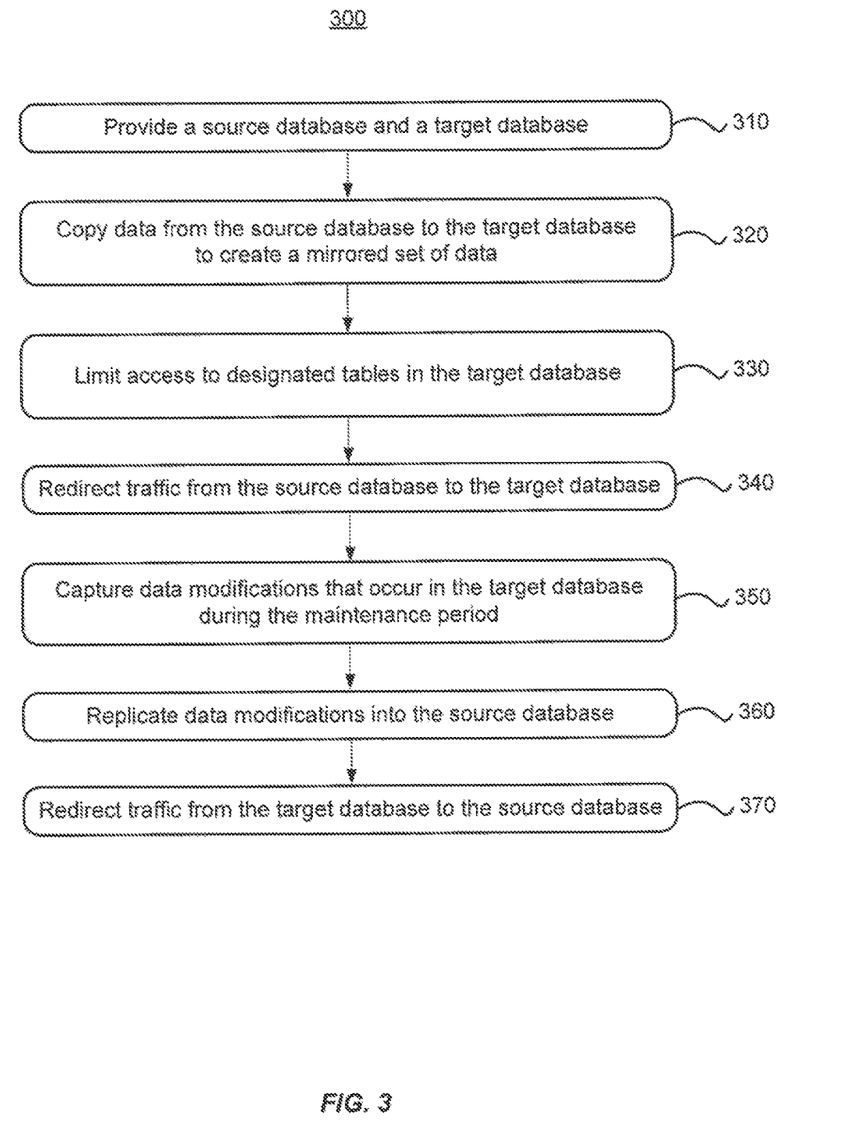
FIG. 3 is a flowchart illustrating steps of a method 300 for reducing database downtime.

FIG. 3 is a flowchart illustrating steps of a method 300 far reducing database downtime. Certain steps of method 300 may be performed in a serial or parallel fashion with respect to other steps of method 300. The order of steps of method 300 as presented in FIG. 3 is in no way intended to restrict the steps of method 300 to being performed in the order as illustrated, nor is it intended to restrict the steps of method 300 to being performed in a serial fashion.

In one embodiment, a source database and a target database may be provided (310). In one embodiment, the source database may be actively in use in a live production environment. In one embodiment, a database. i.e., the source database and/or the target database, may include one or more partitions or volumes. In one embodiment, a database, i.e., the source database and/or the target database, may be replicated across multiple disks and/or servers.

In one embodiment, data may be copied from the source database to the target database in order to create a set of data on the target database that mirrors data stored in the source database (320). In one embodiment, data may be copied on an ongoing basis, ether in real-time, as updates are made to the source database, or periodically (e.g., nightly), as a batch process. In one embodiment, all or a portion of the mirrored data is copied over immediately prior to cutover from the source database to the target database. In one embodiment, when the target database includes storage areas for separate primary and backup volumes, data is copied from the source database to a backup volume on the target database, and then from the target database's backup volume to its primary volume. In one embodiment where data is copied on an ongoing basis, the copying process is stopped prior to preparing the target database for cutover. In the embodiment where data is copied to the target database's backup volume and then to its primary volume, stopping the copying process may comprise stopping both the process that copies data from the source database to the target database and the process that copies data within the target database, from the backup volume to the primary volume.

In one embodiment, access to data in the target database is limited to one or more designated tables (330). These designated tables are typically those in which system-level date is stored, e.g., data related to security, user login functionality, or usability. Access may be limited in any conventional manner, and access may be limited to be read-only or some other level of limited access. In one embodiment, database-level triggers are created for all tables for which access is to be restricted; when a restricted table is accessed, the trigger ensures that the database user is restricted to sanctioned operations. One benefit of using database-level triggers is that one can easily ensure that database accesses from all sources are restricted. In one embodiment, a special database user is created (e.g., for use when the database is accessed by an application server or a particular API); when the special database user attempt to access a restricted table, the trigger ensures that the special database user is restricted to sanctioned operations. In one embodiment, the database trigger raises an exception for every INSERT, UPDATE, or DELETE attempt. In one embodiment, the database trigger permits temporary or short-term modifications to data that are not to be copied back to the source database.

In one embodiment, a first cutover is initiated so that some or all traffic is redirected from the source database to the target database (340). Traffic may include any source or server that accesses the source database (e.g., application servers, web servers, API function calls, web services, local applications). In one embodiment, one or more load balancers handling requests to a first group of application and/or web and/or API servers accessing the source database are configured to redirect requests to a second group of application and/or web and/or API servers that access the target database instead. In one embodiment, the first group of application and/or web and/or API servers are re-configured to access the target database instead of the source database. In one embodiment, load balancers distributing requests from a group of application and/or web and/or API servers to one or more instances of the source database are re-configured to send requests to one or more instances of the target database; such an environment may be typical where the database is replicated for the sake of redundancy, failover, or other reasons.

In one embodiment, admin traffic from the database administrators or other systems administrators performing the maintenance and/or repair tasks upon the source database is still permitted to access the source database. In one embodiment, a rule is created for the load balancers that examiners the request header to determine whether the client's IP address is within a designated network—if so, then the request is allowed to go through to the source database rather than being redirected to the target database.

Once the cutover has completed and the target database is receiving live traffic, in one embodiment, a source or server that accesses the source database (e.g., application servers, web servers, API function calls, web services, local applications) may present indications to a user that functionality is limited. For example, an application server that is connecting to the target database using the special database user may transmit information to display visual cues in a user interface, indicating that a particular online service is temporarily only available for information display and not for information edits—such visual cues may include a banner or pop-up message on a web page, indicating that the website is temporarily read only, or they may include disabled buttons and/or links. In another example, an API function call may return an error message when a database operation such as an INSERT, UPDATE, or DELETE is attempted against the target database.

In one embodiment, during the period of time while the source database is being maintained and/or repaired, any modifications (e.g., INSERT, UPDATE, or DELETE) to mirrored data in the target database are captured (350). In one embodiment, any modifications to mirrored data in the target database are replicated back to the source database (360). Such replication may occur on an ongoing, periodic, or one-time basis. In one embodiment, Oracle Streams apply and propagate processes, or similar technology, are used to replicate data updates in the target database in to the source database in real-time. In one embodiment, Oracle Streams, or a similar technology, is used to perform any transformation or mapping or data from the existing data schema in the target database to a new data schema in the source database.

In one embodiment, a second cutover is then initiated so that any traffic that was redirected to the target database in step 340 is redirected back to the source database (370). In an embodiment where redirection from the source database to the target database was performed by applying a rule in the load balancer, step 370 may be accomplished by simply removing the rule.

Example Architecture

Figure 4:
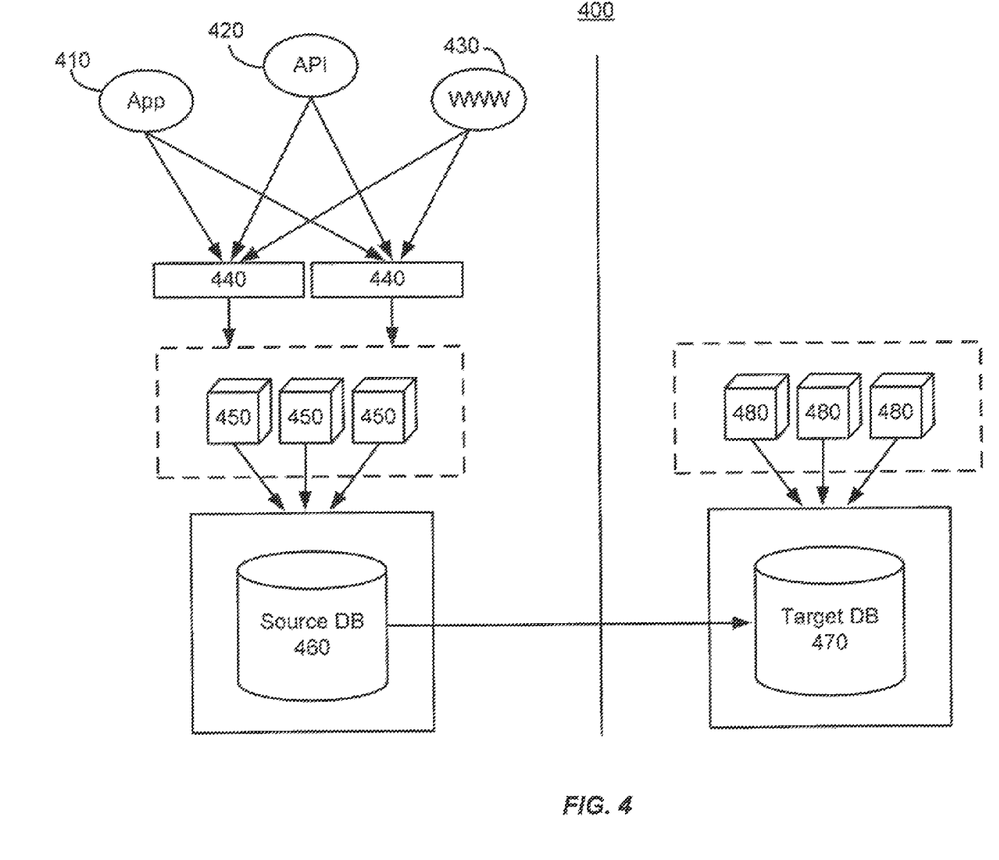
FIG. 4 is a schematic illustrating one embodiment of a system for reducing down-time during a system upgrade, prior to cutover.

FIG. 4 is a schematic illustrating one embodiment of a system 400 for reducing downtime during a system upgrade, prior to cutover. In one embodiment, system 400 may receive request traffic from any typical source or server (e.g., application servers, web servers, API function calls, web services, local applications). In one embodiment, system 400 receives traffic in the form of requests from local applications 410, function calls to API 420, and HTTP requests 430.

In one embodiment, system 400 may include one or more load balancers 440 that handle the incoming requests to distribute the load between a first group of servers 450 (e.g., application and/or web and/or API servers). In one embodiment, the first group of servers 450 send database requests directly to source database 460. In one embodiment, source database 460 is replicated across multiple database servers, and database requests transmitted by the first group of servers 450 to source database 460 are handled by a second group of one or more load balancers distributing such requests amongst the multiple database servers.

In one embodiment, source database 460 may be constantly copying data in real-time to target database 470; this data replication may be handled by any of one or more conventional products and/or services, e.g. Hitachi True-Copy Remote Replication software, EMC Symmetrix Remote Data Facility (SRDF). In one embodiment, source database 470 may replicate the data to a backup volume on target database 470; such data may then be replicated on a primary volume on target database 470 using any of one or more conventional products and/or services, e.g., Hitachi ShadowImage® In-System Replication, EMC Timefinder.

In one embodiment, a second group of servers 480 (e.g., application and/or web and/or API servers) are set up to access target database 470 but are not actively being used yet.

Figure 5:
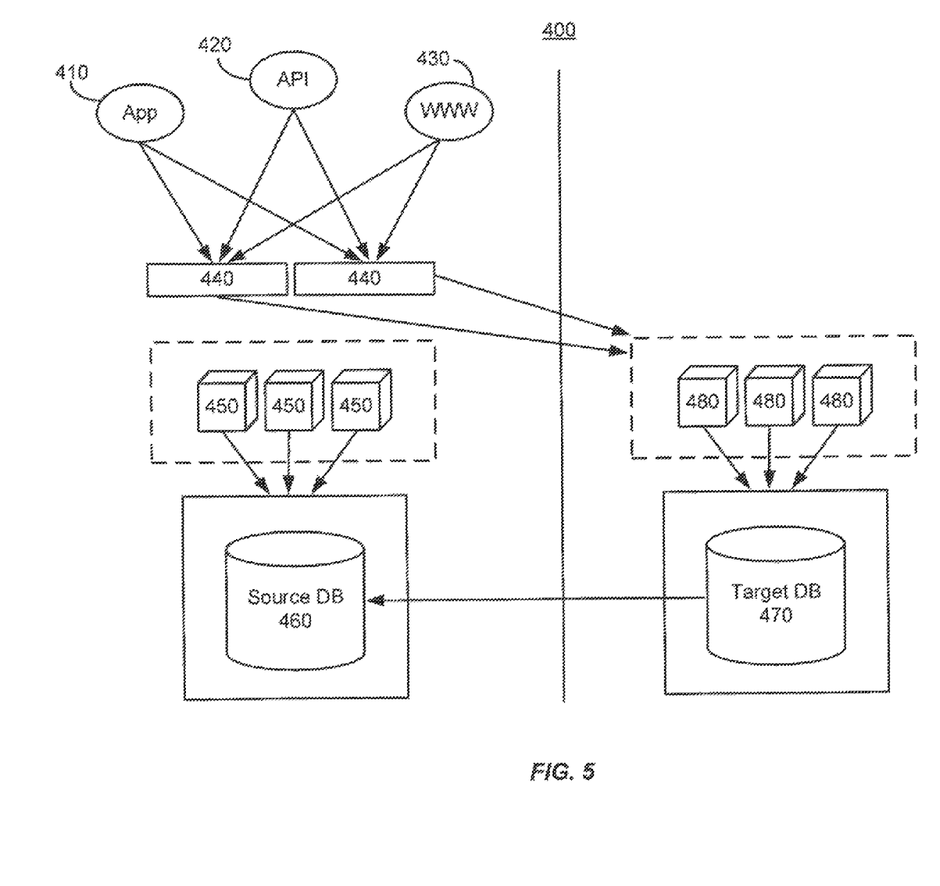
FIG. 5 is a schematic illustrating one embodiment of a system for reducing downtime during a system upgrade, after cutover.

FIG. 5 is a schematic illustrating one embodiment of a system for reducing down-time during a system upgrade, after cutover. In one embodiment, load balancers 440 are configured to redirect requests to a second group of application and/or web and/or API servers 480 that access target database 470 instead of source database 460. In one embodiment, the first group of application and/or web and/or API servers are reconfigured to access the target database instead of the source database. In one embodiment, load balancers distributing requests from a group of application and/or web and/or API servers to one or more instances of the source database are re-configured to send requests to one or more instances of the target database; such an environment may be typical where the database is replicated for the sake of redundancy, failover, or other reasons.

In one embodiment, Oracle Streams apply and propagate processes on target database 470 capture any updates to the data; an Oracle Streams apply process synchronizes all such updates on source database 460. This process of capture data updates may be handled by any of one or more conventional products and/or services.

In one embodiment, prior to making target database 470 available, any running replication processes from a backup volume to a primary volume are stopped. In one embodiment, similar processes are configured on target database 470 to replicate data from the primary volume to the backup volume.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   copying data, using one or more processors associated with one or more servers, from a source database to a target database to create a mirrored set of data;
   limiting access to a subset of one or more selected tables in the target database;
   redirecting general traffic from the source database to the target database, wherein the redirection occurs for a period of time during which maintenance operations are performed on the source database, wherein redirecting general traffic comprises concurrently permitting the administrative traffic to access the source database while redirecting the general traffic from the source database to the target database by determining whether a request is related to general traffic or administrative traffic based on a device address corresponding to a request;
   capturing, using the one or more processors associated with the one or more servers, data modifications occurring in the target database during the period of time to be applied to the source database after the period of time;
   replicating, using the one or more processors associated with the one or more servers, the data modifications into the source database; and
   redirecting general traffic from the target database to the source database after the period of time.

2. The method of claim 1, wherein the general traffic comprises requests received via one of a web server, an application server, a function call to an application programming interface, and a local application.

3. The method of claim 1, wherein limiting access to a table comprises permitting only read access.

4. The method of claim 1, further comprising:
   receiving a request via general traffic related to a table designated for limited access; and
   transmitting information to display an indication that access to information is limited.

5. The method of claim 4, wherein the indication that access to information is limited comprises modifying or removing a button or link to permit edits to information.

6. The method of claim 1, wherein copying data from the source database to the target database comprises continually updating the target database in real-time until a cutover process is initiated.

7. The method of claim 1, wherein copying data from the source database to the target database comprises one or more batch processes performed prior to redirecting general traffic from the source database to the target database.

8. The method of claim 1, further comprising concurrently permitting the administrative traffic to access the source database while redirecting the general traffic from the source database to the target database.

9. The method of claim 8, further comprising determining whether a request is related to general traffic or administrative traffic based on the IP address of the request.

10. The method of claim 1, wherein replicating the data modifications into the source database comprises mapping data in accordance with differences between a data schema of the source database and a data schema of the target database.

11. A system for reducing database downtime for online applications, the system comprising:
    a network interface;
    one or more servers, including one or more processors coupled with the network interface, the one or more processors to copy data from a source database to a target database to create a mirrored set of data, to limit access to a subset of one or more selected tables in the target database, wherein the one or more tables are selected based, at least in part, on row ownership, to redirect general traffic from the source database to the target database, wherein the redirection occurs for a period of time during which maintenance operations are performed on the source database, wherein redirecting general traffic comprises concurrently permitting the administrative traffic to access the source database while redirecting the general traffic from the source database to the target database by determining whether a request is related to general traffic or administrative traffic based on a device address corresponding to a request, to capture data modifications occurring in the target database during the period of time to be applied to the source database after the period of time, to replicate the data modifications into the source database, and to redirect general traffic from the target database to the source database after the period of time.

12. The system of claim 11, wherein the general traffic comprises requests received via one of a web server, an application server, a function call to an application programming interface, and a local application.

13. The system of claim 11, wherein limiting access to a table comprises permitting only read access.

14. The system of claim 11, wherein the one or more servers are further configured to receive a request via general traffic related to a table designated for limited access, and to transmit information to display an indication that access to information is limited.

15. The system of claim 14, wherein the indication that access to information is limited comprises modifying or removing a button or link to permit edits to information.

16. The system of claim 11, wherein copying data from the source database to the target database comprises continually updating the target database in real-time until a cutover process is initiated.

17. The system of claim 11, wherein copying data from the source database to the target database comprises one or more batch processes performed prior to redirecting general traffic from the source database to the target database.

18. The system of claim 11, further comprising concurrently permitting the administrative traffic to access the source database while redirecting the general traffic from the source database to the target database.

19. The system of claim 18, further comprising determining whether a request is related to general traffic or administrative traffic based on the IP address of the request.

20. The method of claim 1, wherein replicating the data modifications into the source database comprises mapping data in accordance with differences between a data schema of the source database and a data schema of the target database.

21. A non-transitory computer-readable medium having stored thereon instructions that, when executed, cause one or more processors to:
- copy data, using one or more processors associated with one or more servers, from a source database to a target database to create a mirrored set of data;
- limit access to a subset of one or more selected tables in the target database, wherein the one or more tables are selected based, at least in part, on row ownership;
- redirect general traffic from the source database to the target database, wherein the redirection occurs for a period of time during which maintenance operations are performed on the source database, wherein redirecting general traffic comprises concurrently permitting the administrative traffic to access the source database while redirecting the general traffic from the source database to the target database by determining whether a request is related to general traffic or administrative traffic based on a device address corresponding to a request;
- capture, using the one or more processors associated with the one or more servers, data modifications occurring in the target database during the period of time to be applied to the source database after the period of time;
- replicate the data modifications into the source database; and
- redirect general traffic from the target database to the source database after the period of time.

22. The non-transitory computer-readable medium of claim 21, wherein the general traffic comprises requests received via one of a web server, an application server, a function call to an application programming interface, and a local application.

23. The non-transitory computer-readable medium of claim 21, wherein limiting access to a table comprises permitting only read access.

24. The non-transitory computer-readable medium of claim 21, further comprising instructions that, when executed, cause the one or more processors to:
- receive a request via general traffic related to a table designated for limited access; and
- transmit information to display an indication that access to information is limited.

25. The non-transitory computer-readable medium of claim 24, wherein the indication that access to information is limited comprises modifying or removing a button or link to permit edits to information.

26. The non-transitory computer-readable medium of claim 21, wherein copying data from the source database to the target database comprises continually updating the target database in real-time until a cutover process is initiated.

27. The non-transitory computer-readable medium of claim 21, wherein copying data from the source database to the target database comprises one or more batch processes performed prior to redirecting general traffic from the source database to the target database.

28. The non-transitory computer-readable medium of claim 21, further comprising instructions that, when executed, cause the one or more processors to concurrently permit the administrative traffic to access the source database while redirecting the general traffic from the source database to the target database.

29. The non-transitory computer-readable medium of claim 28, further comprising instructions that, when executed, cause the one or more processors to determine whether a request is related to general traffic or administrative traffic based on the IP address of the request.

30. The non-transitory computer-readable medium of claim 21, wherein replicating the data modifications into the source database comprises mapping data in accordance with differences between a data schema of the source database and a data schema of the target database.

* * * * *